United States Patent [19]
Tipton

[11] Patent Number: 6,048,371
[45] Date of Patent: Apr. 11, 2000

[54] PROCESS FOR PREPARING SOFT TINTED LENSES

[75] Inventor: Wade Marcel Tipton, Petersfield, United Kingdom

[73] Assignee: Hydron, Ltd., Hampshire, United Kingdom

[21] Appl. No.: 08/977,267

[22] Filed: Nov. 24, 1997

[30] Foreign Application Priority Data

Nov. 25, 1996 [GB] United Kingdom .................... 9624451

[51] Int. Cl.$^7$ ........................................ D06P 5/00
[52] U.S. Cl. ....................... 8/507; 8/506; 8/543; 264/1.1; 351/162; 351/160 H
[58] Field of Search ................ 8/507, 506, 543; 264/1.1; 351/162, 160 H

[56] References Cited

U.S. PATENT DOCUMENTS

| | | |
|---|---|---|
| 3,220,960 | 11/1965 | Wichterle et al. . |
| 4,038,264 | 7/1977 | Rostoker et al. . |
| 4,267,295 | 5/1981 | Gallop et al. ............................ 526/264 |
| 4,379,864 | 4/1983 | Gallop et al. ............................ 523/106 |
| 4,401,797 | 8/1983 | Gallop ...................................... 525/383 |
| 4,452,776 | 6/1984 | Refojo ....................................... 424/81 |
| 4,494,954 | 1/1985 | Suminoe et al. ............................ 8/507 |
| 4,534,916 | 8/1985 | Wichterle ................................. 264/2.1 |
| 4,543,371 | 9/1985 | Gallop et al. ............................ 523/106 |
| 4,559,059 | 12/1985 | Su .............................................. 8/543 |
| 4,634,722 | 1/1987 | Gallop ..................................... 523/106 |
| 4,733,959 | 3/1988 | Claussen et al. ....................... 351/177 |
| 4,786,446 | 11/1988 | Hammar et al. ......................... 264/2.6 |
| 4,861,152 | 8/1989 | Vinzia et al. ............................. 351/161 |
| 4,865,440 | 9/1989 | Neefe . |
| 4,891,046 | 1/1990 | Wittmann et al. .......................... 8/507 |
| 4,963,160 | 10/1990 | Hung et al. ................................. 8/507 |
| 5,032,658 | 7/1991 | Baon et al. .............................. 526/321 |
| 5,037,913 | 8/1991 | Leussler et al. ......................... 526/201 |
| 5,177,168 | 1/1993 | Baron et al. ............................ 526/321 |
| 5,204,383 | 4/1993 | Manabe et al. ......................... 523/118 |
| 5,266,077 | 11/1993 | Auten et al. ................................ 8/507 |
| 5,346,978 | 9/1994 | Baron et al. ............................ 526/321 |
| 5,362,768 | 11/1994 | Askari et al. ........................... 523/106 |
| 5,498,681 | 3/1996 | Askari et al. ........................... 526/246 |
| 5,516,467 | 5/1996 | Niwa et al. ............................... 264/1.1 |
| 5,532,289 | 7/1996 | Benz et al. .............................. 523/106 |

OTHER PUBLICATIONS

Yasuda et al. "Hydrogels of Poly(hydroyethyl Methacrylate) and Hydroxyethyl Methacrylate–Glycerol Monomethacrylate Copolymers", Journal of Polymer Science Part A–1, vol. 4, pp. 2913–2927 (1966) (Month Unknown).

Macret et al "Hydroxyalkyl Methacrylates: hydrogel formation based on the radical copolymerization of 2–hydroxyethyl–methacrylate and 2,3–dihydroxypropyl–methacrylate", Polymer, 1982, vol. 23, May, pp. 748–753.

Businger, "GMA/HEMA: First Report on a Clinical Trial", Spectrum, pp. 19–25, Aug. 1995.

*Primary Examiner*—Alan Diamond
*Attorney, Agent, or Firm*—Todd E. Garabedian; Dale L. Carlson; Wiggin & Dana

[57] ABSTRACT

A process for preparing a soft, tinted lens is described. The process comprises the steps of softening and tinting a xerogel lens 1, wherein the softening and the tinting are achieved by immersing the xerogel lens 1 in a single solution 5 capable of softening and tinting the xerogel lens 1.

10 Claims, 1 Drawing Sheet

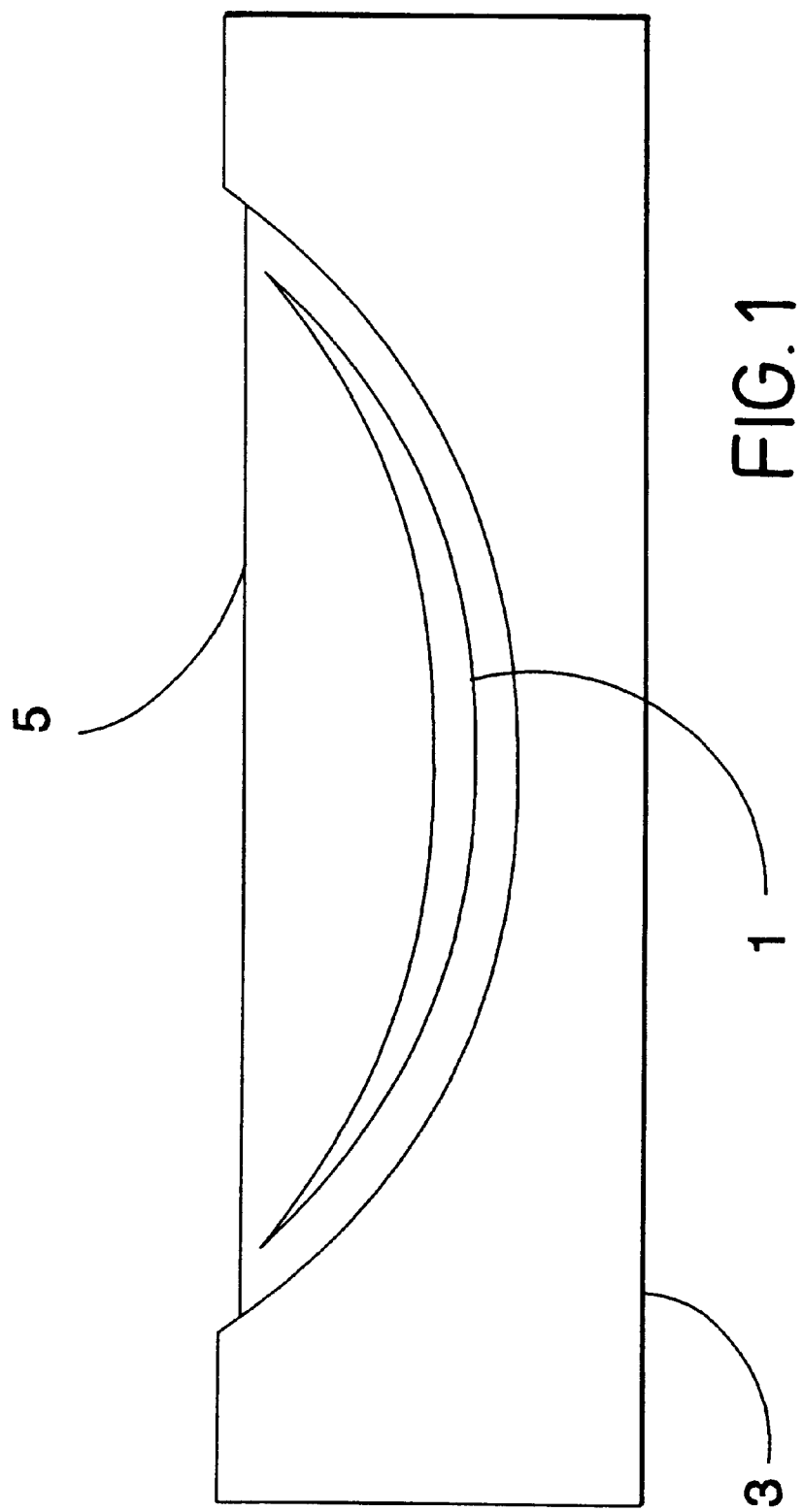

6,048,371

PROCESS FOR PREPARING SOFT TINTED LENSES

BACKGROUND OF THE INVENTION

1. Field of the Invention

This invention relates to a process for preparing a soft, tinted lens. The process has particular, but not exclusive, utility in the preparation of contact lenses.

2. Description of the Prior Art

Soft contact lenses, for example, are commonly tinted so that they can be seen more easily during handling or to change or enhance the natural colour of the wearer's iris. Up until now, the processes commonly used for tinting lenses have been typically highly labour intensive processes that significantly increase the cost of manufacturing. In brief, the known processes involved placing hydrated lenses into a tint solution, then transferring them to a fixer solution and from there via a rinse solution to the inspection container.

An example of just such a process may be found in U.S. Pat. No. 4,891,046. This document discloses a hydrophillic (ie. a soft) tinted contact lens and a process for the preparation thereof. The lens, which is a copolymer, is first softened in a hydrating solution and then tinted by immersion in an aqueous solution of a reactive dye. The tint is then fixed by immersing the tinted lens in a fixing solution. Finally, the tinted lens is then inspected in an inspection solution.

These known processes, whilst enabling the production of soft, tinted contact lenses, suffer from a number of serious disadvantages.

Firstly, the use of a variety of different solutions (eg. hydrating, tinting, fixing, rinsing and inspection solutions) greatly increases the quantity of labour required in the preparation of the lens, and hence also increases the cost of the lens.

Secondly, as the lens is moved a number of times and immersed in a number of different solutions and containers, the likelihood of handling damage being inflicted upon the lens is dramatically increased.

Finally, the step of tinting a hydrated lens in a separate tinting solution has been found to produce lenses that often have an inconsistent tint. In other words, it has been noted that the colour of a tinted lens is often not consistent across its entire surface. It has also been noted that successive lenses may have varying colour tints.

The present invention seeks to alleviate some or all of the problems associated with the known processes.

SUMMARY OF THE INVENTION

In accordance with the present invention, there is provided a process for preparing a soft, tinted lens, the process comprising the steps of softening and tinting a xerogel lens, wherein the softening and the tinting are achieved by immersing the xerogel lens in a single solution capable of softening and tinting the xerogel lens.

In this way, the traditional processes of soft, tinted contact lens preparation, for example, may be improved by reducing the labour required to prepare a given tinted lens. This reduction in labour provides associated improvements in manufacturing efficiency. Similarly, an associated reduction in handling of the lens improves lens quality and reduces the likelihood of any damage being caused to the lens.

Preferably, the single solution is also a fixing solution. The fixing solution may be a basic solution of sufficiently high pH to enable the dye to permanently bond to the polymer. The pH of the fixing solution may be greater than or equal to 8. The fixing solution may be sodium carbonate.

Preferably, the single solution is also an inspection solution. An inspection solution is any solution that allows the visual inspection of a lens that is immersed in that solution. Preferably, the inspection solution is isotonic.

Preferably, the single solution comprises at least one dye. In one embodiment, the dye may be strongly absorbing in the UV region.

The dye used with the present technique may be any suitable dye and may, for example, be selected from the group comprising CI Reactive Blue 163, CI Reactive Red 2, CI Reactive Red 11, CI Reactive Blue 140, CI Reactive Yellow 86 and Procion Black MX-CWA or any other reactive dye or solubilised vat dye.

The lens may be prepared from any one or more of more of the following monomers, hydroxyethylmethacrylate (HEMA), glycerylmethacrylate (GMA), copolymer of HEMA and methacryloxyethyl-phosphorycholine manufactured by Biocompatibles Limited, n-vinylpyrolidone (NVP), methyl methacrylate (MMA) or any other monomer apparent to those skilled in the art of contact lens manufacture.

Preferably, the xerogel lens is a contact lens.

It will be understood by persons skilled in the art that the term xerogel lens refers to a non-hydrated gel.

It will also be understood that the present technique is not to be limited to contact lenses, a particular contact lens material or to any particular dye.

One embodiment of the present invention will now be described, by way of example only, with reference to the appended drawings, in which:

BRIEF DESCRIPTION OF THE FIGURE

The invention will be more fully understood from the following detailed description taken in conjunction with the accompanying drawings in which:

FIG. 1 is a cross sectional view of a xerogel lens in a container.

DETAILED DESCRIPTION OF THE INVENTION

FIG. 1 is a cross sectional view of a xerogel lens 1 in a container 3. The lens 1 may be manufactured from a variety of different materials commonly known to persons skilled in the art. Similarly, the lens can be moulded in the container 3 or manufactured elsewhere and then placed in the container 3.

In the present technique, the lens is placed in a combined softening, tinting, fixing and inspection solution generally indicated by reference 5 in FIG. 1. Advantageously, the solution 5 used in the present technique softens, tints and fixes the tint within the lens.

As the solution used with the present technique softens the lens as well as tinting the lens, for some applications the solution requires a lesser quantity of dye than traditional techniques (typically 8 parts per million (ppm) for a handling tint) in order to tint the lens. The reduced quantity of dye is achievable because the dye is taken up into the lens with the softening solution. This arrangement, as well as enabling a reduction in tint quantity, also offers an improved tint consistency between lenses as the take up rate of tint and softening solution is constant for a given lens material and the lens will, in a relatively short period of time, reach an equilibrium concentration of dye in the solution. Dye concentration may be varied between 4 ppm and 100 ppm or greater or less, depending upon the colour of the tint and the reasons for tinting the lens.

The dye used with the present technique may be any suitable dye and may, for example, be selected from the group comprising CI Reactive Blue 163, CI Reactive Red 2, CI Reactive Red 11, CI Reactive Blue 140, CI Reactive Yellow 86 and Procion Black MX-CWA or any other reactive dye or solubilised vat dye.

Furthermore, the use of a solution with such a reduced quantity of tint renders the solution sufficiently clear to allow inspection of the lens to take place in the solution without having to transfer the lens to an aqueous inspection fluid.

As mentioned above, dye is taken up with solution into the lens. Accordingly, the final tint intensity of the lens is dependent upon the solution content of the lens. However, at equilibrium, most of the dye is situated near the surface of the lens and so lenses with strongly varying thickness profiles (for example toric lenses) appear to have an even tint intensity across the lens.

As the solution according to the present technique is impregnated with a fixer such as sodium carbonate, the dye is fixed within the lens as the dye is being taken up into the lens with the solution. Thus, by immersion in one solution, the lens is softened, dye is taken up into the lens and dye is fixed within the lens.

The tint intensity achievable with the present technique has been shown to withstand at least five repeated autoclave cycles and is resistant to washing with commonly available recommended care solutions based on chemical or peroxide disinfection.

The lens produced by the present technique may be used for the correction of ocular defects and/or for cosmetic purposes and/or for protecting the eyes of a wearer from ultraviolet radiation.

EXAMPLE 1

A solution according to the present invention was made with 8 ppm Reactive Blue 4 dye and 0.5% Sodium Carbonate in de-ionised water. The polymacon (p-HEMA) (i.e. xerogel) lenses were approximately 0.04 mm thick and after hydration had a water content of approximately 38%. These lenses were placed into containers containing the solution. The lenses were inspected in the solution after approximately two and a half hours using a shadowgraph (optical projector, typical magnification X17.5). The lenses were removed after three, six and nine hours, placed in buffered saline in glass vials and given five autoclave cycles each. All the lenses were found to have lost no visible colour after autoclaving and were all good colour matches. In addition, this process does not detrimentally affect the overall water content of the finished hydrated lens.

It will be understood, of course, that the present invention has been described above by way of example only and that modifications may be made within the scope of the appended claims.

I claim:

1. A process for preparing a soft, tinted lens, the process comprising the steps of softening and tinting a xerogel lens, wherein the softening and the tinting are achieved by immersing the xerogel lens in a single solution capable of softening and tinting the xerogel lens, wherein said single solution is also a fixing solution and wherein said fixing solution comprises sodium carbonate, and wherein said single solution comprises a dye.

2. A process according to claim 1, wherein said dye is present in an amount ranging from 4 ppm to 100 ppm and wherein said fixing solution is a basic solution of sufficiently high pH to enable the dye to permanently bond to the xerogel lens.

3. A process according to claim 2, wherein the pH of said fixing solution is greater than or equal to 8.

4. The process according to claim 1, wherein said dye is strongly absorbing in the UV region.

5. A process for preparing a soft, tinted lens, the process comprising the steps of softening and tinting a xerogel lens, wherein the softening and the tinting are achieved by immersing the xerogel lens in a single solution capable of softening and tinting the xerogel lens, wherein said single solution is also a fixing solution and wherein said fixing solution comprises sodium carbonate.

6. A process according to claim 5, wherein said single solution is also an inspection solution.

7. A process according to claim 6, wherein said inspection solution is isotonic.

8. A process according to claim 5, wherein said shingle solution is also a hydrating solution.

9. A process for preparing a soft, tinted lens, comprising the step of immersing a xerogel lens in a solution comprising sodium carbonate and a dye, said solution having a pH greater than or equal to 8, for a sufficient time to produce a softened and tinted lens.

10. The process of claim 9, wherein said solution comprises 0.5% by weight sodium carbonate, 8 ppm Reactive Blue 4 dye, and the balance deionized water.

* * * * *